UNITED STATES PATENT OFFICE.

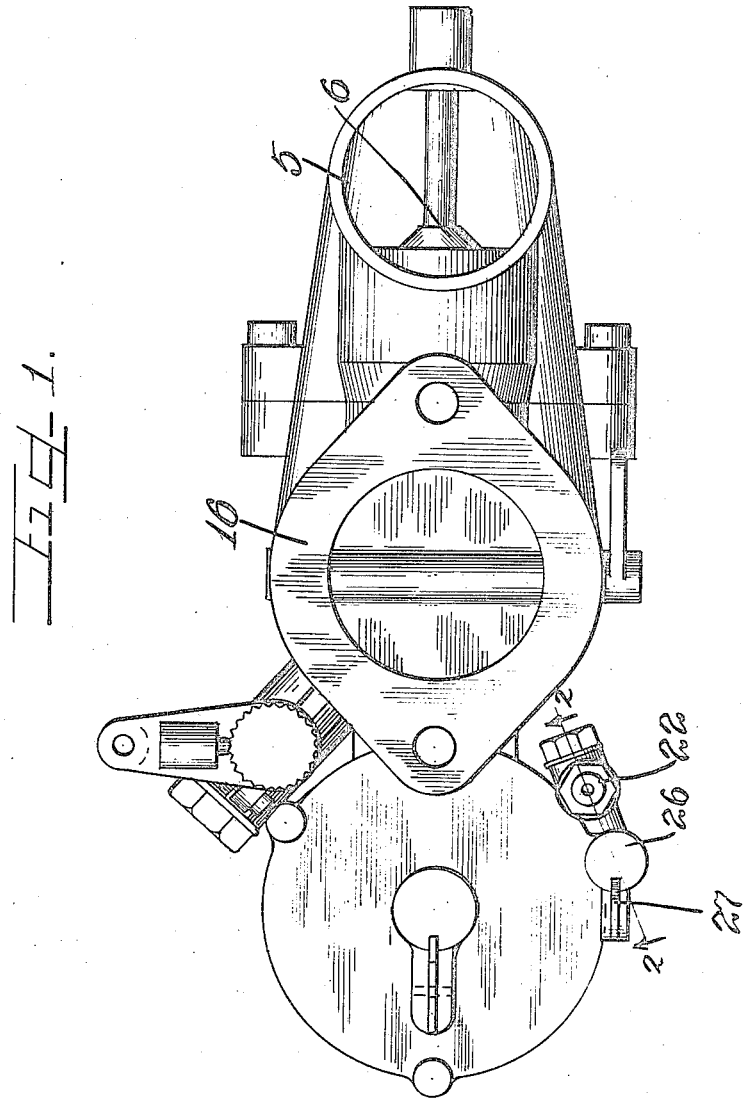

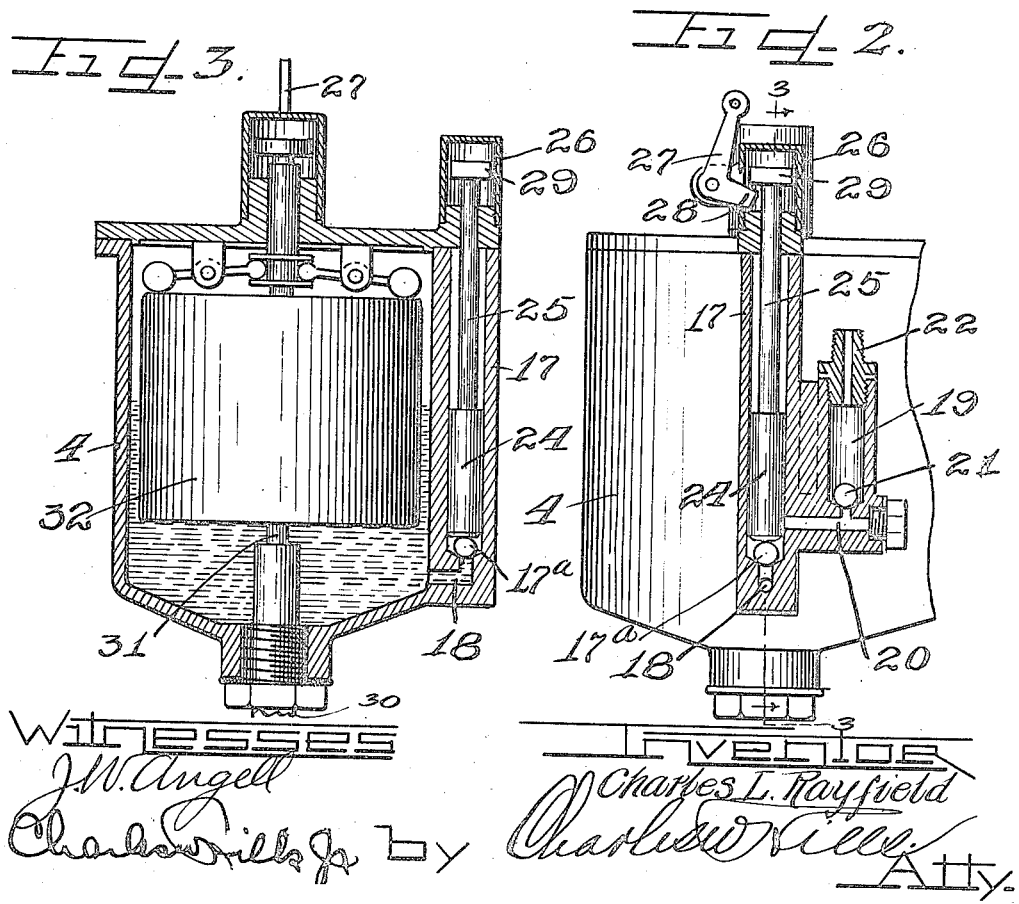

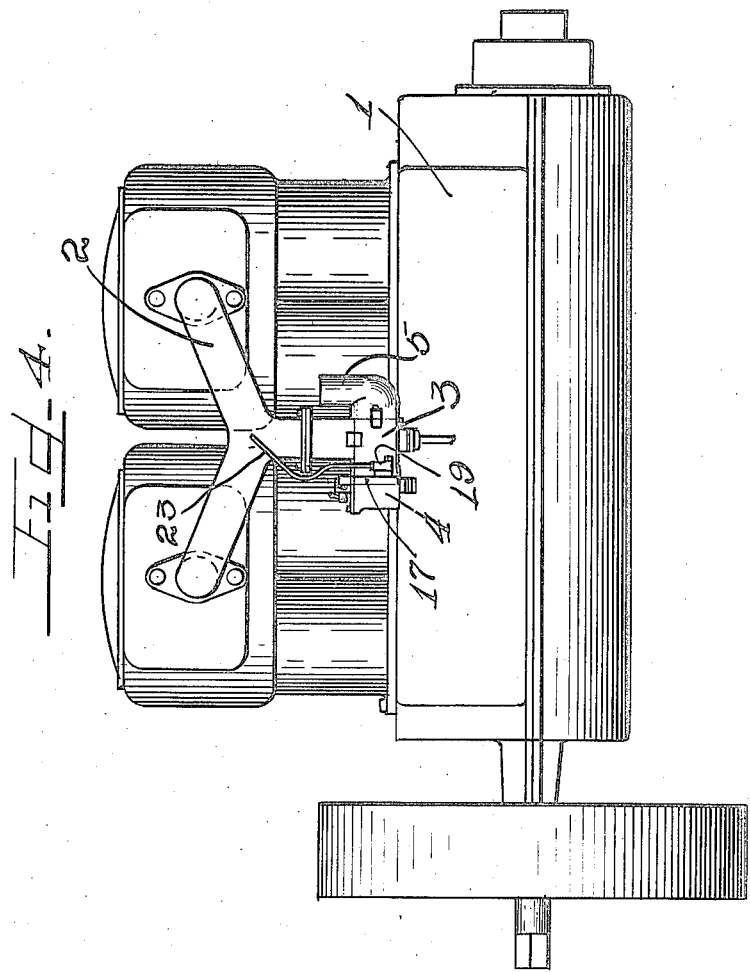

CHARLES L. RAYFIELD, OF CHICAGO, ILLINOIS.

CARBURETER-PRIMER.

1,222,562.

Specification of Letters Patent.

Patented Apr. 10, 1917.

Application filed September 26, 1916. Serial No. 781,950.

*To all whom it may concern:*

Be it known that I, CHARLES L. RAYFIELD, a citizen of the United States, and a resident of the city of Chicago, in the county of Cook and State of Illinois, have invented certain new and useful Improvements in Carbureter-Primers; and I do hereby declare that the following is a full, clear, and exact description of the same, reference being had to the accompanying drawings, and to the numerals of reference marked thereon, which form a part of this specification.

It is a well known fact that in starting internal combustion engines it is oftentimes difficult to rotate the same a sufficient amount by hand to induce carburetion of the air through the carbureter in order to produce a rich mixture capable of starting the engine. Various expedients have been resorted to for providing the engine with an initial rich charge, and for this purpose auxiliary pumps for pumping the fuel directly into the cylinders have been used, and sometimes fuel is introduced into the priming cups at the top of the cylinders, thus necessitating a separate operation for each cylinder of the engine.

This invention relates to a means for injecting a charge of the fuel into the intake manifold of an engine, thereby insuring a distribution of the same to the various cylinders for introduction thereto during the proper cycle of operation.

It is an object of this invention to provide a carbureter having auxiliary valve means connected thereon adapted to feed a charge of fuel directly to the intake manifold of an engine to insure a rich starting charge therefor.

It is also an object of this invention to provide means integrally associated with the carbureter and communicating with the float feed chamber thereof, whereby fuel may be drawn therefrom and introduced into the intake manifold of the engine independently of the operation of the other elements of the carbureter.

It is also an object of this invention to provide means for introducing a charge of fuel to the intake manifold of an internal combustion engine by means communicating directly with the carbureter.

It is also an object of this invention to provide positively actuated and automatically operating valves communicating with the float feed chamber of a carbureter adapted when said manually actuatable valve is operated to permit introduction of a charge of fuel to the intake manifold of the engine.

It is furthermore an object of this invention to provide an independent communication between the intake manifold of the engine and the float feed chamber of the carbureter, whereby a charge of fuel may be introduced into the intake manifold independently of the operation of other parts of the carbureter.

It is finally an object of this invention to construct a carbureter having a priming means associated therewith simple in operation and construction and operating entirely independently of other mechanisms of the carbureter.

The invention (in a preferred form) is hereinafter more fully described and defined in the accompanying drawings and specification.

In the drawings:

Figure 1 is a top plan view of a carbureter embodying a priming device embodying the principles of my invention. Fig. 2 is a fragmentary elevation of the float feed chamber, and showing a section of the priming mechanisms taken on line 2—2 of Fig. 1. Fig. 3 is a section taken on line 3—3 of Fig. 2. Fig. 4 is an elevation of a conventional type of internal combustion engine showing the carbureter connected thereon.

As shown in the drawings:

The reference numeral 1 indicates as a whole an internal combustion engine provided with an intake manifold 2, and a carbureter denoted as a whole by the reference numeral 3. Referring to Fig. 1, the carbureter embraces a float feed chamber 4, and an air intake 5.

The carbureter is provided, as usual, with a suitable attaching flange 16, whereby the same may be bolted to the intake manifold of the engine.

A tubular element 17, is formed on one side of said float feed chamber 4, and communicates therewith by means of a passage 18, in the lower end thereof, such communication however, being normally closed by a ball 17ª. Integral with said element 17, and slightly to one side thereof, is a cylindrical valve chamber 19, which communicates with said element 17, by means of a passage 20, and resting in the lower end of said chamber 19, is a ball valve closure 21. Any suitable type of pipe connection 22, may be threaded into the upper open end of said chamber 19, for attachment thereto of a pipe 23, which is connected to the intake manifold of the internal combustion of the carbureter, thus permitting an introduction of fuel to the intake manifold irrespective of the position of said throttle valve.

A piston 24, is slidably mounted in said tubular element 17, and when in its lowest position, as shown in Fig. 2, closes the passage 20, thus preventing a flow of fuel from the float feed chamber of the carbureter through the respective pipes 22, and 23, to the manifold of the engine. For the purpose of actuating said piston 24, or lifting the same to open position, the same is provided with a rod or stem 25, which projects into a compartment or casing 26, suitably and preferably detachably connected on one side of the cover of the float feed chamber and having journaled thereon to project therein an actuating bell crank 27, which may be connected to any suitable rod or cable for manual actuation thereof. Said bell crank 27, has an inwardly projecting arm 28, which projects into said casing 26, adapted to engage beneath a head 29, on the end of said stem 25, to lift the same and the piston therewith to open the communicating passages for the introduction of fuel to the intake manifold of the engine.

Of course, the float feed chamber of the carbureter is connected to any suitable source of fuel supply by means of the pipes 30, the flow of fuel being controlled, as usual, thereinto, by means of a needle valve 31, connected for operation by a float 32.

The operation is as follows:

When it is desired to start the engine the throttle valve is closed, though not necessarily so, and the crank 27, actuated by any suitable means, thus opening the piston valve 24, so that with a rotation of the crank shaft of the engine the movement of the pistons in the cylinders will create a draft in the intake manifold, thus drawing a charge of liquid fuel up through the various passages 18, 20, and pipe 23, and spraying the same into the manifold. A rich mixture is thereby afforded, which is drawn into the respective cylinders at the proper time when the intake valves thereof are opened, and the engine may be easily started, thus obviating all priming operations by means of auxiliary mechanism.

Of course, after the engine has started the piston valve 24, is allowed to close by the release of said crank 27, and the carbureter then operates as usual. The chamber 19, serves to hold a sufficient quantity of fuel to feed the intake manifold of the engine after the piston valve 24, has been closed, insuring operation thereof until proper carburetion begins to take place through the carbureter in the usual manner, the ball valve 21, in said chamber 19, of course acting to prevent a reverse flow of a fuel charge through the device.

I am aware that various details of construction may be varied through a wide range without departing from the principles of this invention. I therefore do not purpose limiting the patent granted otherwise than necessitated by the prior art.

I claim as my invention:

1. The combination with a carbureter of a priming device comprising a chamber in communication with the interior of the float chamber of the carbureter, and a pipe line communicating into the manifold of an engine in which the carbureter is connected beyond the throttle valve of the carbureter, a secondary chamber with which said pipe line is in communication, a check valve controlling the flow from the float chamber into said first mentioned chamber, a check valve controlling the flow from said first mentioned chamber into said secondary chamber, a passage leading from said last mentioned check valve communicating laterally in said first mentioned chamber, and a pump or piston slidably mounted in said first mentioned chamber adapted in its lower position of movement to close said passage communicating laterally into said first mentioned chamber, and seating upon said first mentioned check valve to insure the same remaining closed.

2. The combination with the float chamber of a carbureter, of an upright auxiliary chamber associated therewith, a piston movable therein, a second auxiliary chamber communicating laterally with said first mentioned auxiliary chamber with the flow thereto adapted to be cut off by the side wall of said piston, and piping connections between said second auxiliary chamber and the manifold of a gasolene engine.

3. In a device of the class described the combination with the float chamber of a carbureter, of a long upright cylindrical chamber associated therewith and communicating thereinto, a valve controlling communication between said float chamber and said auxiliary chamber, a piston slide valve member movable in said second mentioned chamber, and another upright auxiliary chamber connected through the side wall with said first mentioned auxiliary chamber and also connected with the intake manifold of a gasolene engine adapted to receive a charge of fuel passed from said float chamber through said first chamber into said second chamber and to be drawn into the manifold by the draft of the engine.

4. In a device of the class described a cylinder, a piston movable therein, a check valve controlling the inlet through said cylinder to prevent a reverse flow through said inlet, a chamber in communication with said cylinder, a check valve in said chamber to prevent reverse flow from said chamber into said cylinder, said piston disposed to control the flow from said cylinder into said chamber, and a pipe connecting said chamber with the manifold pipe of an internal combustion engine.

5. In a device of the class described the combination with the float feed chamber of a carbureter, of an upright cylinder cast integral therewith and communicating with the interior of said float feed chamber, a ball valve in the lower end of said cylinder preventing a reverse flow from said cylinder into said chamber, a piston movable vertically in said cylinder, an upright auxiliary chamber formed integral with said cylinder, a horizontal passage affording communication between said auxiliary chamber and said cylinder and adapted to be closed by said piston, a ball valve preventing reverse flow from said auxiliary chamber into said cylinder, and a pipe connecting said auxiliary chamber and the intake manifold of a gasolene engine.

6. In a device of the class described the combination with the float feed chamber of a carbureter, of a vertically disposed cylinder formed on the exterior thereof, a piston movable in said cylinder, means for elevating said piston, an auxiliary chamber vertically disposed adjacent said cylinder, a horizontal passage affording communication between said chamber and said cylinder, said passage adapted to be closed by said piston when the same is in its lower limit of movement, a passage affording communication between said cylinder and said float feed chamber, and a pipe connecting said auxiliary chamber with the intake manifold of a gasolene engine.

7. The combination with the float chamber of a carbureter, of a vertically disposed auxiliary chamber formed on one side thereof, a pipe connecting said auxiliary chamber with the manifold of an internal combustion engine, and a piston valve disposed to slide over the inlet to said chamber to control the flow of fluid into said auxiliary chamber from said float feed chamber.

In testimony whereof I have hereunto subscribed my name in the presence of two subscribing witnesses.

CHARLES L. RAYFIELD.

Witnesses:
 CHARLES W. HILLS, Jr.,
 FRANK K. HUDSON.